US011970952B2

(12) United States Patent
Li

(10) Patent No.: US 11,970,952 B2
(45) Date of Patent: Apr. 30, 2024

(54) METHOD AND SYSTEM FOR ROTOR STABILIZATION

(71) Applicant: General Electric Company, Schenectady, NY (US)

(72) Inventor: Guoxin Li, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 16/570,366

(22) Filed: Sep. 13, 2019

(65) Prior Publication Data

US 2021/0079792 A1  Mar. 18, 2021

(51) Int. Cl.
*F01D 5/10* (2006.01)
*F01D 5/02* (2006.01)
(Continued)

(52) U.S. Cl.
CPC ............. *F01D 5/10* (2013.01); *F01D 5/027* (2013.01); *F16C 32/0463* (2013.01);
(Continued)

(58) Field of Classification Search
CPC F01D 5/10; F01D 25/164; F16F 15/03; F16F 15/035; F16F 15/322; F16F 2222/06
See application file for complete search history.

(56) References Cited

U.S. PATENT DOCUMENTS 4,866,318 A * 9/1989 Habermann ........ F16C 32/0444
  324/207.16
5,347,190 A * 9/1994 Lewis .................. F16C 32/0455
  310/90.5

(Continued)

FOREIGN PATENT DOCUMENTS

AU    2015201595 A1 * 10/2016

OTHER PUBLICATIONS

Yoon et al., "Introduction to Rotor Dynamics", Control of Surge in Centrifugal Compressors by Active Magnetic Bearings Theory and Implementation, Springer, London, 2013, pp. 17-55.

*Primary Examiner* — Christopher R Legendre
(74) *Attorney, Agent, or Firm* — Dority & Manning, P.A.

(57) ABSTRACT

A system and method for controlling rotor dynamics at a rotor assembly. The system includes a magnetic actuator and a controller. The magnetic actuator is positioned in magnetic communication with the rotor assembly and is configured to obtain a measurement vector corresponding to the rotor assembly and a measurement vector indicative of a rotor dynamics parameter. The magnetic actuator is further configured to selectively output an electromagnetic force at the rotor assembly. The controller is configured to store and execute instructions. The instructions include outputting, via the magnetic actuator, a baseline electromagnetic force to the rotor assembly; obtaining the measurement vector at the rotor assembly from the magnetic actuator; determining non-synchronous vibrations corresponding to the rotor assembly based at least on the measurement vector and a rotor speed of the rotor assembly; determining cross coupled stiffness corresponding to the rotor assembly based at least on the measurement vector, the rotor speed, and a predetermined rotor dynamics model of the rotor assembly; determining an adjusted electromagnetic force of the rotor assembly based at least on the cross coupled stiffness and a damping factor corresponding to the electromagnetic force output from the magnetic actuator; and generating an output signal corresponding to the adjusted electromagnetic force to the rotor assembly.

17 Claims, 5 Drawing Sheets

(51) Int. Cl.
  *F16C 32/04* (2006.01)
  *F16F 15/32* (2006.01)
  *G01M 1/14* (2006.01)

(52) U.S. Cl.
  CPC ...... *F16F 15/322* (2013.01); *F05D 2270/334* (2013.01); *G01M 1/14* (2013.01)

(56) References Cited

U.S. PATENT DOCUMENTS

| | | | |
|---|---|---|---|
| 6,094,989 A * | 8/2000 | Twerdochlib | G01N 29/46 |
| | | | 702/56 |
| 6,623,164 B1 * | 9/2003 | Gozdawa | F16C 32/0666 |
| | | | 384/119 |
| 7,356,371 B2 | 4/2008 | Dixon et al. | |
| 7,415,389 B2 | 8/2008 | Stewart et al. | |
| 8,344,673 B2 | 1/2013 | Rotondo et al. | |
| 8,548,648 B2 | 10/2013 | Sahasrabudhe et al. | |
| 9,342,481 B2 | 5/2016 | Swearingen et al. | |
| 9,531,236 B2 | 12/2016 | Filatov | |
| 10,168,248 B1 * | 1/2019 | Morey | G01M 13/045 |
| 10,547,258 B2 * | 1/2020 | Ciciriello | F16C 32/0489 |
| 2012/0217904 A1 * | 8/2012 | Tonoli | F16F 15/002 |
| | | | 318/114 |
| 2017/0254715 A1 | 9/2017 | Rix | |
| 2017/0353078 A1 | 12/2017 | Post | |
| 2021/0079792 A1 * | 3/2021 | Li | F01D 5/10 |

\* cited by examiner

METHOD AND SYSTEM FOR ROTOR STABILIZATION

FIELD

The present subject matter relates generally to damping systems and methods for rotor assemblies. The present subject matter relates more specifically to active damping systems and methods for turbo machines.

BACKGROUND

Damping systems, such as squeeze film dampers at bearing assemblies for turbo machines, may generally target a broad operating range of the rotor assembly for a turbo machine to which the damper system is attached. Such damping systems may be passive systems. Such damping systems may be insufficient to provide damping, or adequate damping, at more targeted operating speeds or conditions. For instance, such broad frequency bandwidth damping systems may be insufficiently effective to provide damping relative to rotor whirl, such as Alford whirl, or other undesired rotor dynamics conditions, such as bowed rotor starts, clearance control, non-synchronous vibrations (NSV), or general vibrations suppression.

As such, there is a need for improved damping systems for rotor assemblies and turbo machines.

BRIEF DESCRIPTION

Aspects and advantages of the invention will be set forth in part in the following description, or may be obvious from the description, or may be learned through practice of the invention.

A system and method for controlling a rotor assembly is provided. The system and method may include systems and methods for mitigating undesired rotor dynamics, rotor whirl, or vibrations from the rotor assembly. The system includes a magnetic actuator and a controller. The magnetic actuator is positioned in magnetic communication with the rotor assembly and is configured to obtain a measurement vector corresponding to the rotor assembly and a measurement vector indicative of a rotor dynamics parameter. The magnetic actuator is further configured to selectively output an electromagnetic force at the rotor assembly. The controller is configured to store and execute instructions or one or more steps of the method. The method or instructions include outputting, via the magnetic actuator, a baseline electromagnetic force to the rotor assembly; obtaining the measurement vector at the rotor assembly from the magnetic actuator; determining non-synchronous vibrations corresponding to the rotor assembly based at least on the measurement vector and a rotor speed of the rotor assembly; determining cross coupled stiffness corresponding to the rotor assembly based at least on the measurement vector, the rotor speed, and a predetermined rotor dynamics model of the rotor assembly; determining an adjusted electromagnetic force of the rotor assembly based at least on the cross coupled stiffness and a damping factor corresponding to the electromagnetic force output from the magnetic actuator; and generating an output signal corresponding to the adjusted electromagnetic force to the rotor assembly.

In one embodiment, determining non-synchronous vibrations includes removing a synchronous vibrations signal via a Fourier transform function.

In another embodiment, determining cross coupled stiffness is further based at least on the predetermined rotor dynamics model comprising a predetermined rotor bending mode of the rotor assembly.

In yet another embodiment, determining the adjusted electromagnetic force is further based on a proportional compensation factor. In one embodiment, determining the adjusted electromagnetic force is further based on a proportional compensation factor corresponding to a gap between the magnetic actuator and the magnetic material of the rotor assembly. In another embodiment, the proportional compensation factor includes an integral of the output signal corresponding a current corresponding to the adjusted electromagnetic force to the rotor assembly, and a slope of the current corresponds to the gap between the magnetic actuator and the rotor assembly.

In various embodiments, the instructions further include filtering the output signal corresponding to the adjusted electromagnetic force based at least on a determined frequency of a rotor bending mode of the determined non-synchronous vibrations. In still various embodiments, the instructions further include converting the output signal from a digital signal to an analog signal via a current to power amplifier. In one embodiment, the instructions further include generating to the rotor assembly, via the magnetic actuator, the adjusted electromagnetic force corresponding to the output signal. In another embodiment, converting the output signal includes converting the output signal from a current unit to a voltage unit corresponding to the adjusted electromagnetic force.

In still yet various embodiments, the instructions further include trending, over a period of time, the non-synchronous vibrations and the cross coupled stiffness based on a threshold. In one embodiment, the instructions further include determining the damping factor based at least on the cross coupled stiffness and the trended non-synchronous vibration over the period of time.

In one embodiment, the measurement vector includes at least a two orthogonal direction vibration signal corresponding to the rotor assembly.

Another aspect of the present disclosure is directed to a turbo machine including a rotor assembly including a magnetic material, a magnetic actuator positioned in magnetic communication with the magnetic material of the rotor assembly, wherein the magnetic actuator is configured to selectively output an electromagnetic force at the rotor assembly, and wherein the magnetic actuator is configured to obtain a measurement vector corresponding to the rotor assembly, wherein the measurement vector comprises at least a two orthogonal direction vibration signal corresponding to the rotor assembly; and a controller configured to store and execute instructions according to one or more instructions described above and further herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
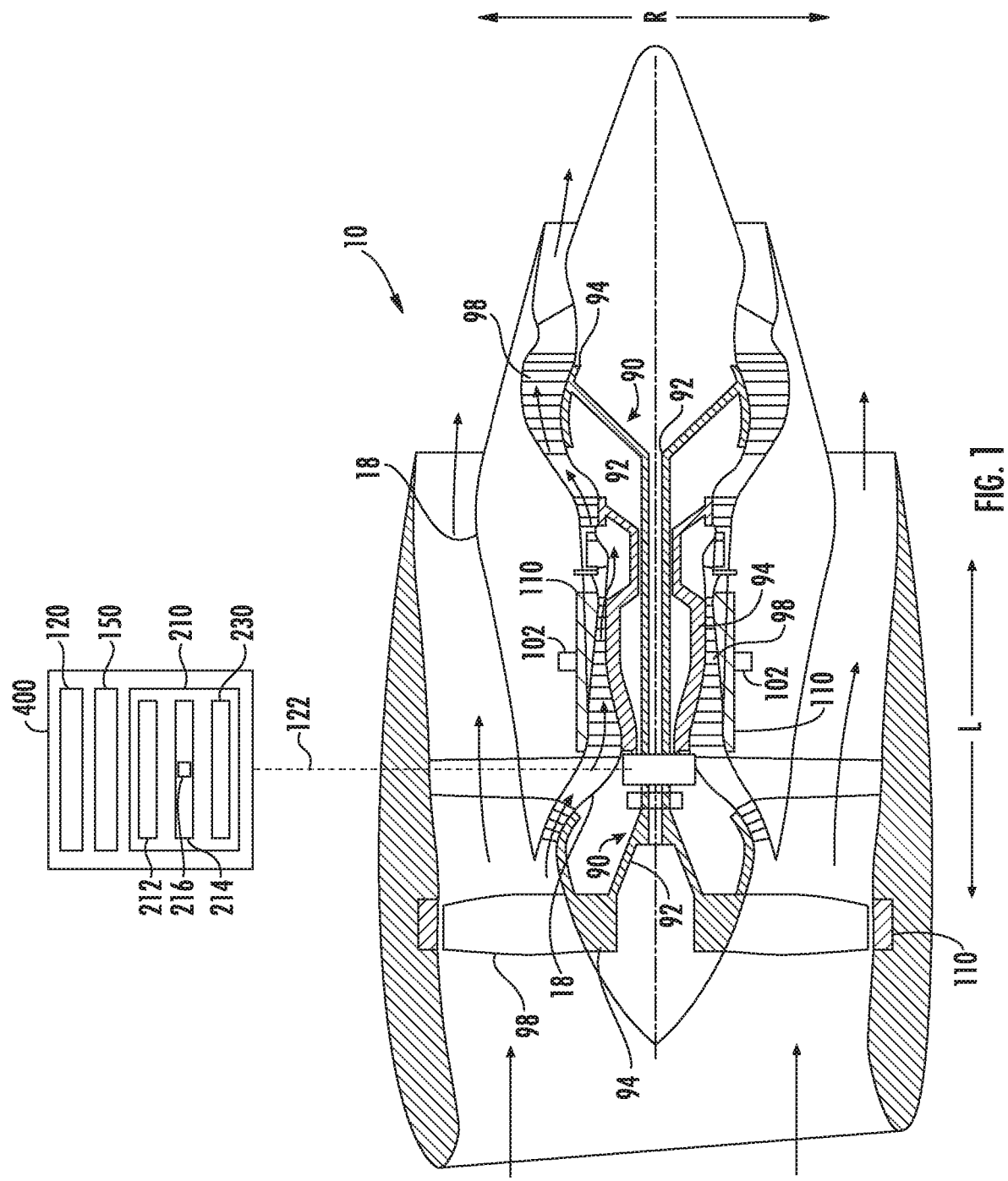
FIG. 1 is an exemplary schematic cross sectional view of an embodiment of a turbo machine including systems for detecting, mitigating, and attenuating undesired rotor dynamics.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Referring now to the drawings, FIG. 1 is a schematic embodiment of an exemplary engine 10 including an exemplary system for controlling rotor dynamics (hereinafter, "system 100") at the engine 10. The engine 10 generally includes a rotor assembly 90 including a shaft 92 and rotor 94. The rotor 94 may define a disk or hub to which a plurality of airfoils or blades 98 is attached. Further embodiments of the engine 10 include a casing 18 at least partially surrounding the rotor assembly 90. The casing 18 further includes bearing assemblies, fluid supply and scavenge conduits, dampers, etc. such as to support and position the rotor assembly 90 relative to the casing 18. In various embodiments, the engine 10 defines a turbo machine configuration, such as, but not limited to, a turbofan, a turboprop, a turboshaft, a turbojet, a propfan, or other turbo machine configuration. The engine 10 may additionally, or alternatively, define a heat engine, such as a Brayton cycle machine.

Figure 2:
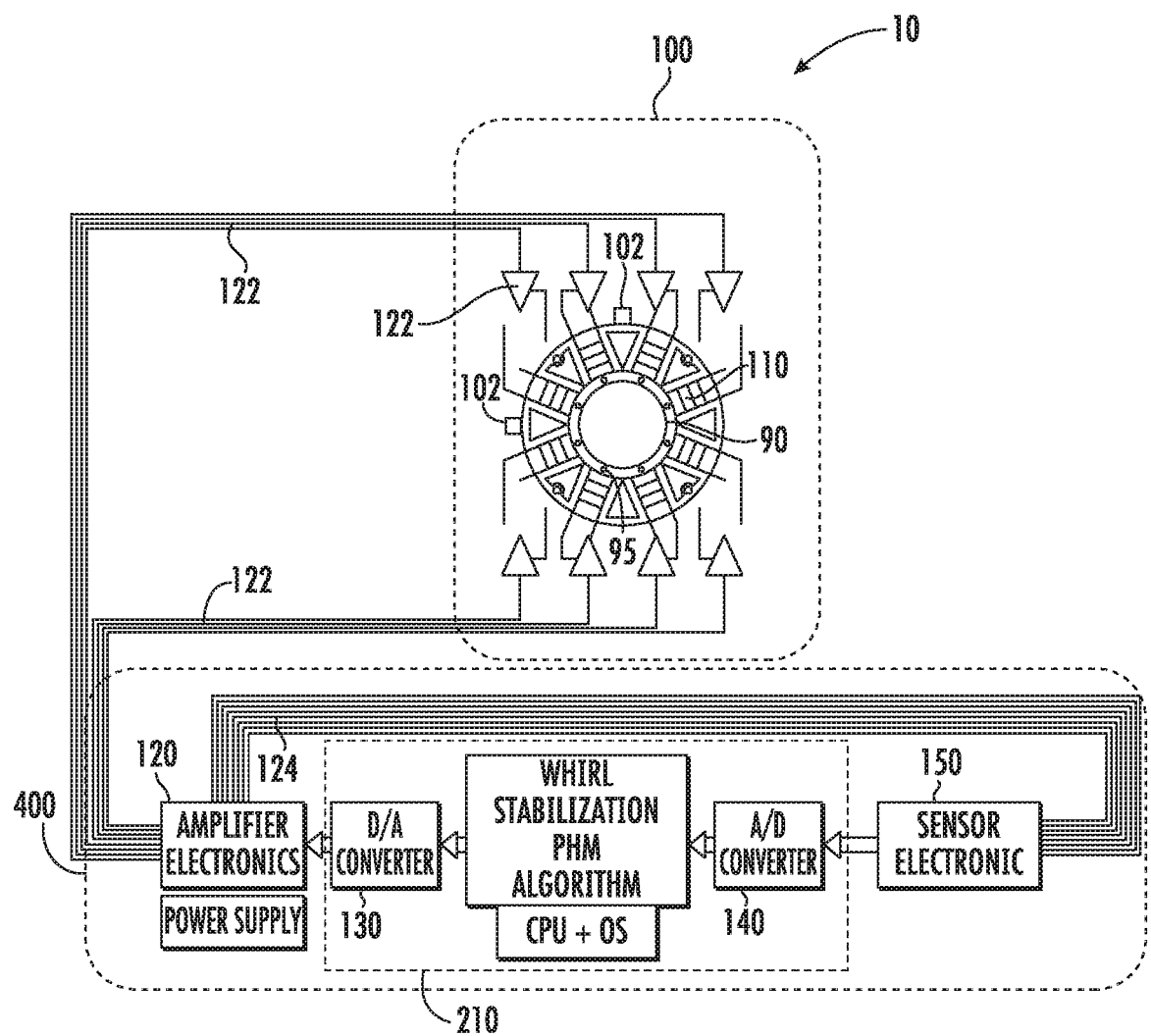
FIG. 2 is a schematic view of a rotor assembly operatively connected to systems for detecting, mitigating, and attenuating undesired rotor dynamics.
Figure 3:
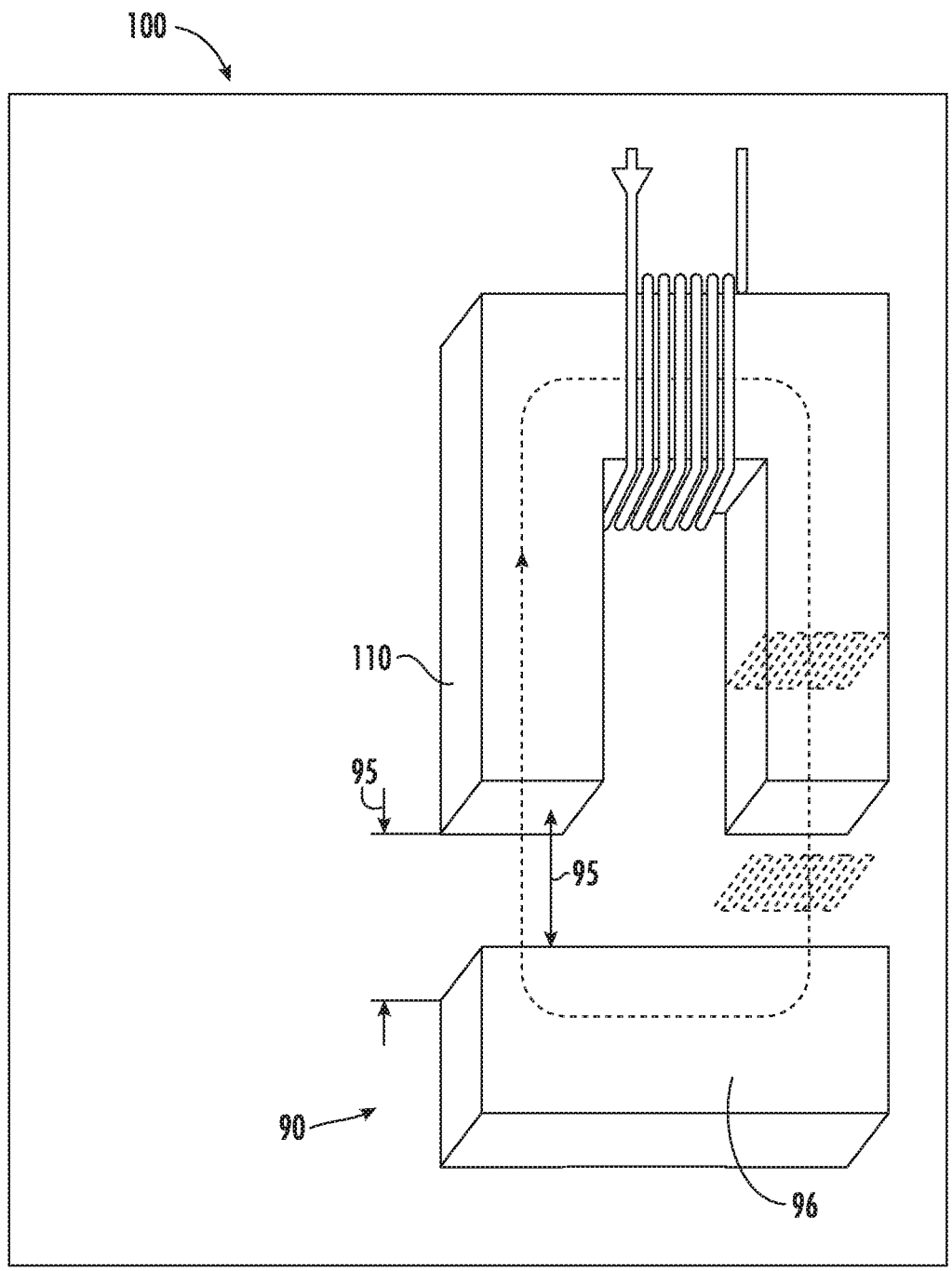
FIG. 3 is a perspective view of a portion of the systems provided in regard to FIGS. 1-2.

Referring now to FIGS. 1-3, the engine 10 further includes the system 100 configured to measure, detect, calculate, or otherwise obtain signals corresponding to vibrations from operation of the rotor assembly 90 and forces applied thereto by the system 100. In various embodiments, the system 100 includes a magnetic actuator 110 positioned in magnetic communication with the rotor assembly 90. Various embodiments of the rotor assembly 90 includes at least a region of a magnetic material 96 (FIG. 3) attached to one or more of the shaft 92 or rotor 94. Various embodiments of the magnetic actuator 110 include a plurality of electromagnetic coils and a laminator stator positioned in electromagnetic communication with the magnetic material 96 of the rotor assembly 90 (FIG. 3). The magnetic actuator 110 is configured to selectively output an electromagnetic force (EMF) at the rotor assembly 90 via at least the magnetic material 96 at the rotor assembly 90 based at least on steps of a method 1000 for controlling rotor dynamics (hereinafter, "method 1000") further described herein.

In one embodiment, the magnetic material 96 is positioned at the rotor assembly 90 such as to attenuate destabilizing forces from operation of the rotor assembly 90. The magnetic actuator 110 is further positioned proximate to the shaft 92 of the rotor assembly 90 including the magnetic material 96. Destabilizing forces may be referred to as tangential forces generally at the rotor assembly 90. Destabilizing forces may particularly refer to aerodynamic excitation due to Alford forces, or Alford whirl, or friction-induced forces generally. The magnetic actuator 110 may further be positioned at the rotor assembly 90 such as to provide active damping to assist or alleviate bowed rotor starts (BRS), suppression of non-synchronous vibrations (NSV), active clearance control, or suppressing undesired rotor vibrations generally. Alford whirl instability may result from tangential forces or friction forces induced by deflection of the rotor assembly 90 along a radial direction R, referred to as cross coupled forces. The tangential forces may result from non-uniform or non-axisymmetric clearances between the rotor assembly 90 and the casing 18 surrounding the rotor assembly 90. For example, the tangential forces may result from non-uniform blade tip clearances of the rotor 94 of the rotor assembly 90 relative to an inner diameter or shroud of the casing 18.

Referring now to FIG. 2, a schematic embodiment of the system 100 is further provided. The system 100 includes a controller 210 configured to operate the magnetic actuator 110 and determine an output EMF to the rotor assembly 90 to control rotor dynamics at the rotor assembly 90. Various embodiments of the system 100 include the magnetic actuator 110 configured to detect, measure, calculate, or otherwise obtain a measurement vector corresponding to the rotor assembly 90. In particular embodiments, the magnetic actuator 110 is configured to obtain the measurement vector via signal feedback responses between the magnetic actuator 110 and the rotor assembly 90. In various embodiments, the magnetics actuator 110 includes or defines an inductance sensor configured to detect, measure, or otherwise determine an inductance change. The measurement vector includes a vibration signal or measurement corresponding to the rotor assembly 90. In still various embodiments, the system 100 includes a sensor 102 in addition to the magnetic actuator 110. The sensor 102 may additionally be configured to detect, measure, calculate, or otherwise obtain a measurement vector corresponding to the rotor assembly 90. Various embodiments of the sensor 102 may include an accelerometer, or a pair or more thereof, positioned to obtain a two orthogonal direction vibration signal corresponding to the rotor assembly 90.

In particular embodiments, the magnetic actuator 110 provides a high speed measurement acquisition and response relative to the lower speed measurement acquisition of the sensor 102 (e.g., the sensor 102 defining an accelerometer, capacitance probe, etc.). In one embodiment, the sensor 102 may provide a second measurement vector signal against which a first measurement vector signal from the magnetic actuator 110 is compared.

In still various embodiments, measurement vector corresponds, at least in part, to a gap 95 between the rotor assembly 90 and the magnetic actuator 110 and/or sensor 102. In a particular embodiment, the gap 95 is between the magnetic material 96 of the rotor assembly and the magnetic actuator 110. In one embodiment, the sensor 102 may be integrated to the magnetic actuator 110 such as to obtain or quantify the gap 95. In various embodiments, the gap 95 is proportional to a slope of the current through the magnetic actuator 110 and the magnetic material 96 of the rotor assembly 90.

The magnetic actuator 110, the sensor 102, or both, may include a capacitance probe configured to correlate the gap 95 to an output signal corresponding to current at the magnetic actuator 110. During initial operation of the rotor assembly 90, a baseline EMF corresponding to a baseline current and voltage is provided from the magnetic actuator 110 to the rotor assembly 90.

During operation of the rotor assembly 90 (i.e., during rotation of the rotor assembly 90), the controller 210 determines non-synchronous vibrations based at least on the measurement vector and a rotational speed or rotor speed of the rotor assembly 90. Synchronous vibrations at the engine 10 typically can be identified at frequencies corresponding to integer multiples of a frequency corresponding to the rotor speed of the rotor assembly 90 (e.g., 1x frequency). Non-synchronous vibrations at the engine 10 can be identified at frequencies different than the integer multiples of the frequency corresponding to the rotor speed. In a particular embodiment, a processor 212 of the controller 210 determines non-synchronous vibrations using the measurement vector defining the two orthogonal direction vibration signal and the rotor speed. A Fourier transform, or particularly a discrete Fourier transform (DFT, FIG. 4), or other signal conversion algorithm may further be utilized to provide a real-time correlation of the rotor speed to remove a synchronous vibration signal to determine the non-synchronous vibration signal. The processor 212 may utilize discretized Fourier transform to convert the real-time input rotor speed and the measurement vector signals into samples of a discrete-time Fourier transform corresponding to the real-time inputs. The discretized Fourier transform may particularly determine a magnitude and phase of the non-synchronous vibrations corresponding to the rotor assembly 90, or further corresponding to the rotor speed thereof.

Associated memory 214 of the controller 210 may further store one or more rotor dynamics models against which the measurement vector and an input signal to the magnetic actuator 110 is tracked in real-time to determine cross coupled forces or cross coupled stiffness $K_{xy}$ at the rotor assembly 90. The rotor dynamics model may include one or more mode shapes corresponding to one or more frequencies of rotor bending modes at the rotor assembly 90, one or more frequencies corresponding to rotor speed, and parameterized cross coupled stiffness. The input signal to the magnetic actuator 110 may include an input current or voltage from a power unit 120 at the controller 210. The power unit 120 includes a power amplifier and a power supply for operation of the magnetic actuator 110. An input signal to the magnetic actuator 110, such as shown schematically at lines 122 in FIGS. 1-2, includes one corresponding to the baseline EMF during initial operation of the rotor assembly 90. The input signal 122 further includes one corresponding to one or more previous signals during further operation of the rotor assembly 90.

The determined cross coupled stiffness at the engine 10 is utilized to determine an adjusted output EMF from the magnetic actuator 110 to the rotor assembly 90 and to generate an output signal to the magnetic actuator 110 corresponding to the adjusted EMF. Generating the output signal to the magnetic actuator 110 may further include filtering the output signal corresponding to the determined cross coupled stiffness. Filtering the output signal is be based at least on one or more determined frequencies of rotor bending mode corresponding to the non-synchronous vibrations and the rotor dynamics model. Filtering the output signal may be performed by a digital to analog converter 130, or DC/AC converter. The DC/AC converter 130 may further convert an output current to an output voltage at the magnetic actuator 110 in which the output voltage corresponds to a desired gap 95 between the magnetic actuator 110 and the rotor assembly 90.

Figure 4:
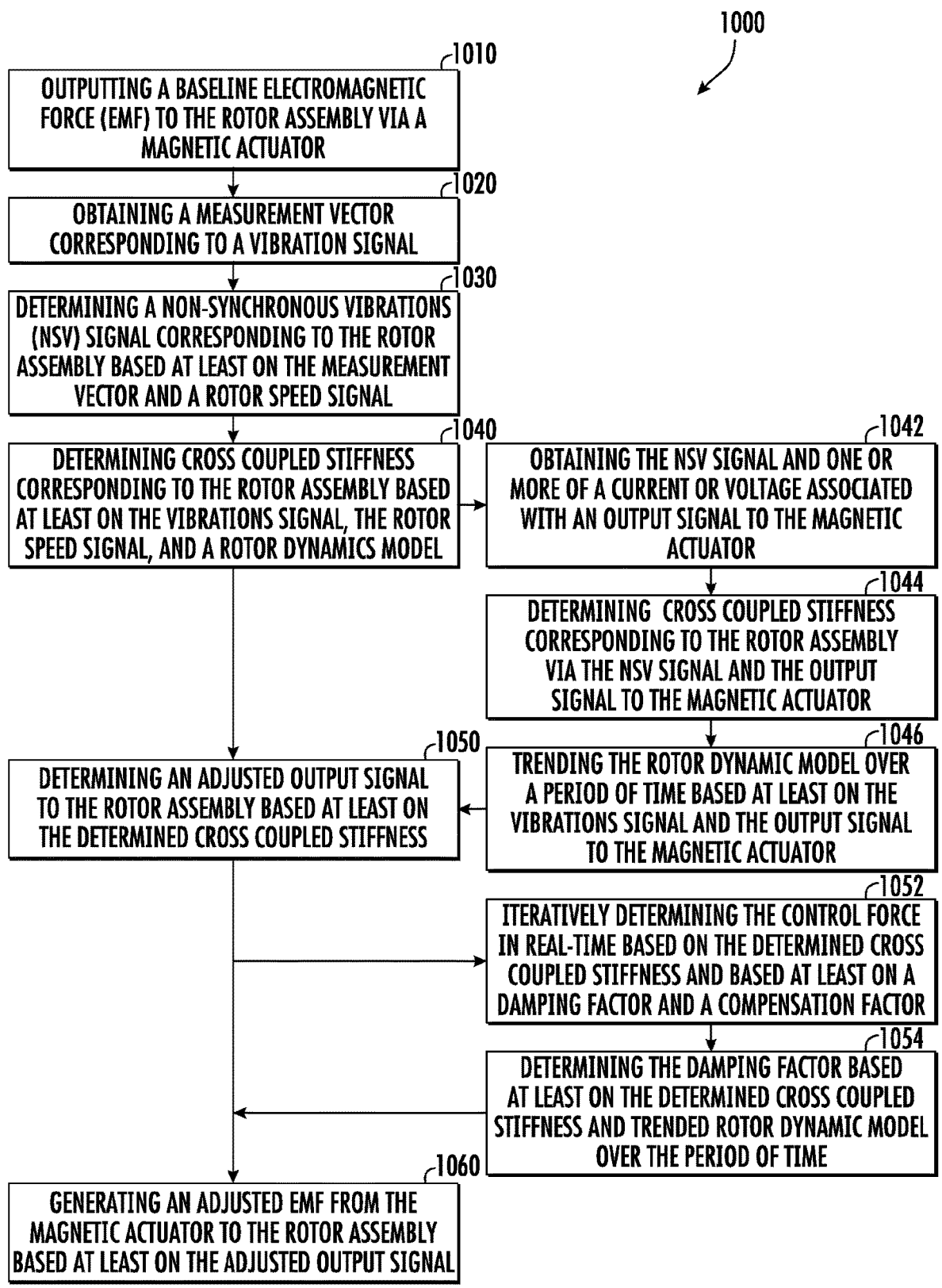
FIG. 4 is flowchart outlining steps of a method for detecting, mitigating, and attenuating undesired rotor dynamics from a rotor assembly.
Figure 5:
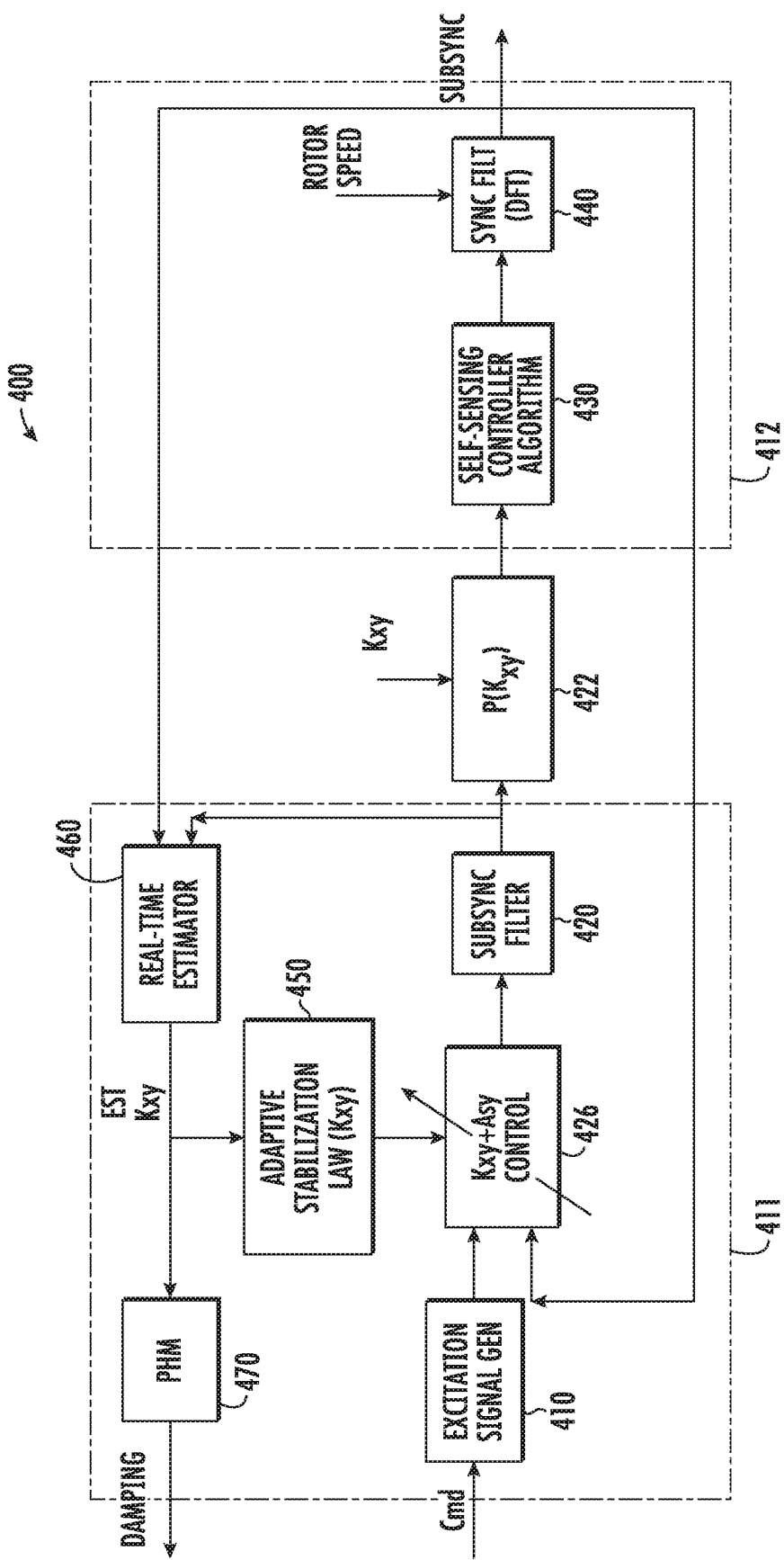
FIG. 5 is a schematic diagram of a portion of a system for detecting, mitigating, and attenuating undesired rotor dynamics.

Referring now to FIG. 4, a flowchart outlining exemplar steps of a method for controlling rotor dynamics, such as rotor whirl or Alford whirl, at a rotor assembly of a turbo machine is generally provided (hereinafter, "method 1000"). The method 1000 outlined in regard to FIG. 4 may be implemented with the system 100 shown and described in regard to FIGS. 2-3. The method 1000 may further be implemented with the system 100 and engine 10 provided in regard to FIGS. 1-2. However, it should be appreciated that the method 1000 may be implemented on any engine or system including a magnetic actuator system and controller configured to output an electromagnetic force at a rotor assembly such as to desirably control rotor dynamics.

The method 1000 includes at 1010 outputting a baseline electromagnetic force (EMF) to the rotor assembly via a magnetic actuator. The baseline EMF may generally correspond to a predetermined output current or voltage signal from a controller (e.g., controller 210) to the magnetic actuator (e.g., magnetic actuator 110) during initial steady state or transient operation of the rotor assembly.

During initial operation of the rotor assembly, a sensor (e.g., the magnetic actuator 110, the sensor 102, or both) detects, measures, calculates, or otherwise obtains a vibrations signal from the rotor assembly, such as outlined at step 1020 of the method 1000. In various embodiments, an analog-to-digital converter (e.g., an A/D converter 140 in FIG. 2) extracts a two orthogonal direction vibration signal from a raw vibration signal obtained from the sensor (e.g., the magnetic actuator 110, the sensor 102, or both). The converted vibrations signal may correspond to the two orthogonal direction vibration signal corresponding to the rotor assembly such as to indicate a magnitude and direction of vibrations at the rotor assembly.

At 1030, non-synchronous vibrations (NSV) corresponding to the rotor assembly are determined based at least on the vibrations signal and a rotor speed signal of the rotor assembly. In various embodiments, such as described in regard to FIGS. 1-3, determining NSV is performed utilizing a discretized Fourier transform. The discretized Fourier transform correlates in real-time the rotor speed signal (e.g., a frequency signal corresponding to the rotor speed signal) and the vibrations signal to remove a synchronous vibrations signal from the vibrations signal such as to determine NSV. The Fourier transform, or other signal conversion algorithm, converts the raw sensor data into spectral data. The spectral data provides a frequency domain representation from which one or more frequency components of interest in the sensor data, such as the vibrations signal, can be determined as corresponding to a source of vibration at the rotor assembly. The spectral data may correspond to the two orthogonal direction vibration signal indicating magnitude and direction of vibrations from the rotor assembly.

The method 1000 further includes at 1040 determining cross coupled stiffness corresponding to the rotor assembly based at least on the vibrations signal, the rotor speed signal, and a rotor dynamics model of the rotor assembly, such as described in regard to FIGS. 1-3. The rotor dynamics model includes one or more frequencies associated with a rotor bending mode of the rotor assembly. In various embodiments, the method 1000 at 1040 includes at 1042 obtaining the vibrations signal, or particularly the spectral data associated with the NSV signal determined at 1030, and one or more of a current or voltage associated with an output signal to the magnetic actuator and at 1044 determining cross coupled stiffness corresponding to the rotor assembly via the NSV signal and the output signal to the magnetic actuator. In one embodiment, determining cross coupled stiffness further includes at 1046 estimating or trending the rotor dynamic model over a period of time based at least on the vibrations signal, or particularly the determined NSV, and the output signal to the magnetic actuator. In still various embodiments, trending the rotor dynamic model over a period of time is based at least on a parameterized cross coupled stiffness, rotor speed signal, and one or more mode shapes corresponding to one or more frequencies of rotor bending at the rotor assembly.

At 1050, the method 1000 further includes determining an adjusted output signal to the rotor assembly based at least on the determined cross coupled stiffness. In various embodiments, the method 1000 further includes at 1060 generating an adjusted EMF from the magnetic actuator to the rotor assembly based at least on the adjusted output signal. In still various embodiments, generating the adjusted EMF is based at least on iteratively determining a control force necessary to operate the rotor assembly below a predetermined threshold vibration signal versus rotor speed. In one embodiment, determining an adjusted output signal further includes at 1052 iteratively determining the control force in real-time based on the determined cross coupled stiffness and further based at least on a damping factor and a compensation factor.

In another embodiment, the method 1000 further includes at 1054 determining the damping factor based at least on the determined cross coupled stiffness and trended rotor dynamic model over the period of time at 1046.

In still another embodiment, the method 1000 further includes at 1056 determining the compensation factor based at least on a gap (e.g., gap 95 in FIG. 2) between the magnetic actuator and the rotor assembly (i.e., the magnetic material 96 at the rotor assembly 90 depicted at FIG. 3). The gap may generally correspond to a capacitance between the rotor assembly (i.e., the magnetic material of the rotor assembly) and the magnetic actuator. The method 1000 may further include at 1058 converting the output signal corresponding to a current (e.g., a first output signal) to an output signal corresponding to a voltage (e.g., a second output signal). The first output signal current integrates the second output signal voltage, in which the current signal is proportional to the gap (gap 95 in FIG. 2) between the rotor assembly and the magnetic actuator. In various embodiments, converting the output signal at 1058 is performed by a digital-to-analog converter (e.g., D/A converter 130 at FIG. 2). The output signal corresponding to a voltage signal to the magnetic actuator generates the adjusted EMF from the magnetic actuator to the rotor assembly, such as outlined in regard to the method 1000 at 1060.

In still another embodiment, determining the adjusted output signal at 1050 further includes at 1055 filtering the output signal corresponding to a current signal based at least on one or more frequencies of rotor bending mode via the rotor dynamics model. The filtered current signal (e.g., filtered first output signal) may be converted to the second output signal corresponding to the output voltage to the magnetic actuator, such as described in regard to the method 1000 at 1058 and 1060.

Referring now to FIG. 4, a schematic chart depicting steps of a system for adaptive stabilization of a rotor assembly is further provided (hereinafter, "system 400"). The system 400 outlined in regard to FIG. 4 includes one or more steps of the method 1000 outlined in regard to FIG. 4 and the system 100 shown and described in regard to FIGS. 1-2. In various embodiments, the system 400 includes an excitation signal generator 410 at which an initial output signal to the magnetic actuator 110 (FIGS. 1-2) generates a baseline EMF to the rotor assembly 90 (FIG. 1).

The system 400 may further include an adaptive stabilization controller 450. The adaptive stabilization controller 450 compensates an estimated cross coupled stiffness iteratively based at least on an output signal from a real-time estimator 460. The adaptive stabilization controller 450 adjusts a ratio of magnetic force (e.g., magnetic force from the magnetic actuator 110 in FIG. 2) corresponding to damping ratio in each orthogonal direction. In various embodiments, the adjusted ratio of magnetic force in each orthogonal direction accounts for or compensates for supporting structure asymmetry, such as in surrounding casings 18 (FIG. 1) or other frames or supports.

In various embodiments, the real-time estimator 460 provides an on-line parameterized rotor dynamic model with at least an input cross coupled stiffness (such as an output signal from a sub-sync filter 420, further discussed below), a modal frequency, damping, and modeshape, such as described in regard to the method 1000. The real-time estimator 460 may further provide a model tracking filter or online estimator with actuator excitation or stabilization input. The real-time estimator 460, and steps of the method 1000 associated thereto, may include determining frequency damping and modeshape with excitation. The real-time estimator 460 may further include tracking of real time cross coupled stiffness $K_{xy}$, such as output from the sub-sync filter 420. In various embodiments, the real-time estimator 460 may provide real-time signal detection, such as at steady-state rotor speeds, transient rotor speeds, or both.

The system 400 further includes a sub-synchronous filter or sub-sync filter 420 defining at least in part a first feedback controller 411. The first feedback controller 411 may include a derivative controller to adjust damping of the engine 10 and system 100. The system 400 includes a proportional controller 422 configured to stabilize negative stiffness generated by the magnetic actuator 110 (FIGS. 1-2). In various embodiments, the sub-sync filter 420 further includes a derivative controller configured to adjust damping via the damping factor, such as determined via the method 1000 at 1056. The sub-sync filter 420 may still further include a cross coupled stiffness compensator 426 configured to determine cross coupled stiffness $K_{xy}$ based at least on an estimated cross coupled stiffness, such as determined via the method 1000 at 1044. In various embodiments, the sub-sync filter 420 provides a substantially no phase-loss filtering targeting a non-broad bandwidth in contrast to a passive damper control system for a magnetic actuator or bearing.

The proportional controller 422 may receive signals at least from the sub-sync filter 420 and the cross coupled stiffness $K_{xy}$. In various embodiments, a slope of an electrical current from the system 400 is proportional to the gap 95 between the rotor assembly 90 and the magnetic actuator 110 (FIG. 2).

The system 400 may include a second feedback controller 412 providing a first signal to the cross coupled stiffness compensator 426 and a second signal to the real-time estimator 460. The second feedback controller 412 may include a self-sensing controller 430 configured with narrow bandwidth signal processing. The self-sensing controller 430 may be configured to receive an output signal from the proportional controller 422. The self-sensing controller 430 is configured to determine the gap (e.g., gap 95 in FIG. 2) between the magnetic actuator 110 and the rotor assembly 90 (FIGS. 1-2). The self-sensing controller 430 may further determine the gap 95 via the magnetic actuator 110 without direct measurement via an external sensor (e.g., the magnetic actuator 110, the sensor 102, or both). The self-sensing controller 430 may be configured to execute steps corresponding to the method 1000. In various embodiments, the self-sensing controller 430 defines a sensor 150 (FIG. 2) providing sensor sensing of magnetic self-sensing of the gap 95 (FIG. 2) between the rotor assembly 90 and the magnetic actuator 110 (FIG. 2).

The system 400 may further include a synchronous filter or sync filter 440 configured to receive a signal output from the self-sensing controller 430 and a speed signal from the rotor assembly 90 (FIGS. 1-2). The sync filter 440 may include a Fourier transform, or a discrete Fourier transform (DFT), such as to provide a real-time correlation of the rotor speed to remove a synchronous vibration signal to determine the non-synchronous vibration signal, such as described in regard to the method 1000. The output signal from the self-sensing controller 430 may utilize the sync filter 440 to provide online correlation to subtract or remove a synchronous vibration signal from the output signal. Such online correlation may particularly minimize phase distortion of the output signal.

Referring back to the first controller 411, the system 400 may further include a performance health monitoring (PHM) unit 470. In one embodiment, the PHM unit 470 includes an excitation signal generator configured to generate and apply an excitation signal, such as a damping signal, to the magnetic actuator 110. The excitation signal may define a multisine signal, a sweepsine signal, or a random signal. The excitation signal may be based at least in part on the estimated cross coupled stiffness such as to determine and generate rotor effective damping, or effective damping ratio at the rotor assembly 90, such as described in regard to method 1000.

Embodiments of the engine 10, system 100, and method 1000 shown and described in regard to FIGS. 1-4 may provide an improved apparatus and method for controlling engine rotor dynamics, such as attenuating undesired vibrations generally, or providing active clearance control, or suppressing BRS, or attenuating or mitigating Alford whirl or NSV particularly, or rotor rub-induced rotor whirl (e.g., due to friction forces). Embodiments provided herein may further provide active damping and feedback control to mitigate undesired vibrations. The embodiments provided herein may particularly target tangential forces, or utilize signals or measurements corresponding to tangential forces, rather than, or in addition to, velocity driven forces.

In general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 can include control logic 216 stored in memory 214. The control logic 216 may include instructions that when executed by the one or more processors 212 cause the one or more processors 212 to perform operations, such as steps of the method 1000 outlined and described in regard to FIGS. 2-4.

Additionally, as shown in FIG. 1, the controller 210 can also include a communications interface module 230. In several embodiments, the communications interface module 230 can include associated electronic circuitry that is used to send and receive data. As such, the communications interface module 230 of the controller 210 can be used to receive data from rotor assembly 90 or one or more other portions of the system 100, 400. In addition, the communications interface module 230 can also be used to communicate with any other suitable components of the engine 10, including any number of sensors configured to detect, determine, mitigate, or otherwise stabilize undesired rotor dynamics, vibrations, rotor whirl, clearances, or other modes of operation of the rotor assembly 90 and engine 10. It should be appreciated that the communications interface module 230 can be any combination of suitable wired and/or wireless communications interfaces and, thus, can be communicatively coupled to one or more components of the engine 10 via a wired and/or wireless connection. As such, the controller 210 may obtain, determine, store, generate, transmit, or operate any one or more steps of the method 1000 at the engine 10, an apparatus to which the engine 10 is attached (e.g., an aircraft), or a ground, air, or satellite-based apparatus in communication with the engine 10 (e.g., a distributed network).

Various embodiments of the engine 10 and systems 100, 400 shown and described herein may provide desirable improvements for damping systems for rotor assemblies and turbo machines. In various embodiments, the systems 100, 400 may provide direct targeting of destabilizing tangential forces generated by cross coupled stiffness rather than general vibration damping. The systems 100, 400 provided may provide damping and feedback control between one or more controllers and the magnetic actuators and rotor assembly in contrast to passive damping systems or proportional/derivative controllers alone. Additionally, or alternatively, the systems 100, 400 shown and described herein may target frequency bandwidth of a narrower sub-synchronous region rather than broad bandwidth control, such as may occur relative to passive damping systems. Still further, or alternatively, embodiments provided herein may provide desirable feedback control, narrower target bandwidth frequencies, or other benefits relative to whirl detection (e.g., Alford Whirl), cross coupled force identification, stability margin testing and identification, ad generating stabilizing forces, damping, clearance control, NSV suppression, bowed rotor start assistance or mitigation, or other alleviations to undesired rotor dynamics.

In an exemplary embodiment of the system 100, 400, engine 10, and operation thereof, when unstable operation of the rotor assembly occurs (e.g., rotor whirl, Alford forces, etc.), the system 100, 400, or method 1000 applied to the engine 10, may provide damping and feedback control via the magnetic actuators 110 to the rotor assembly 90 within a fraction of a second. As unstable operation of a rotor assembly may cause relatively quick and exponential increases vibration (e.g., within 1 to 2 seconds), unbalance, eccentric movement, rotor whirl, undesired tangential forces, or other operating modes that may damage the rotor assembly, a surrounding casing, bearings, or other portions of the engine, or complete engine failure, embodiments of the system 100, 400, engine 10, and method 1000 provided herein may provide damping and feedback control such as to mitigate or eliminate propagation of one or more such undesired rotor dynamics of the rotor assembly.

In an exemplary embodiment, the system 100, 400, engine 10, and/or method 1000 may provide desired damping and feedback within 1 second. For example, the system 100, 400 or method 1000 may determine and generate one or more signals, responses, outputs, or other actions described herein within 1 second. In another exemplary embodiment, the system 100, 400, engine 10, and/or method 1000 may provide desired damping and feedback within 750 milliseconds. In yet another exemplary embodiment, the system 100, 400, engine 10, and/or method 1000 may provide desired damping and feedback within 500 milliseconds. In still another exemplary embodiment, the system 100, 400, engine 10, and/or method 1000 may provide desired damping and feedback within 250 milliseconds. In still yet another exemplary embodiment, the system 100, 400, engine 10, and/or method 1000 may provide desired damping and feedback within 100-250 milliseconds. It should be appreciated that embodiments of the systems, methods, and engine provided herein may provide improvements over other methods, systems, engines, sensors, or computing devices, or combinations thereof, such as those for detecting, determining, or generating signals, responses, or operations for damping, mitigating, or eliminating vibrations, tangential forces, whirl, or other undesired rotor dynamics at a rotor assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject of the following clauses:

1. A system for controlling rotor dynamics at a rotor assembly, the system comprising a magnetic actuator positioned in magnetic communication with the rotor assembly, wherein the magnetic actuator is configured to selectively output an electromagnetic force at the rotor assembly, and wherein the magnetic actuator is configured to obtain a measurement vector indicative of a rotor dynamics parameter; and a controller configured to store and execute instructions, the instructions comprising outputting a baseline electromagnetic force to the rotor assembly; obtaining the measurement vector at the rotor assembly; determining non-synchronous vibrations corresponding to the rotor assembly based at least on the measurement vector and a rotor speed of the rotor assembly; determining cross coupled stiffness corresponding to the rotor assembly based at least on the measurement vector, the rotor speed, and a predetermined rotor dynamics model of the rotor assembly; determining an adjusted electromagnetic force of the rotor assembly based at least on the cross coupled stiffness and a damping factor corresponding to the electromagnetic force output from the magnetic actuator; and generating an output signal corresponding to the adjusted electromagnetic force to the rotor assembly.
2. The system of any preceding clause, wherein determining non-synchronous vibrations comprises removing a synchronous vibrations signal via a Fourier transform function.
3. The system of any preceding clause, wherein determining cross coupled stiffness is further based at least on the predetermined rotor dynamics model comprising a predetermined rotor bending mode of the rotor assembly.
4. The system of any preceding clause, wherein determining the adjusted electromagnetic force is further based on a proportional compensation factor.
5. The system of any preceding clause, the instructions further comprising filtering the output signal corresponding to the adjusted electromagnetic force based at least on a determined frequency of a rotor bending mode of the determined non-synchronous vibrations.
6. The system of any preceding clause, the instructions further comprising converting the output signal from a digital signal to an analog signal via a current to power amplifier.
7. The system of any preceding clause, the instructions further comprising generating to the rotor assembly, via the magnetic actuator, the adjusted electromagnetic force corresponding to the output signal.
8. The system of any preceding clause, wherein converting the output signal comprises converting the output signal from a current unit to a voltage unit corresponding to the adjusted electromagnetic force.
9. The system of any preceding clause, the instructions further comprising trending, over a period of time, the non-synchronous vibrations and the cross coupled stiffness based on a threshold.

10. The system of any preceding clause, the instructions further comprising determining the damping factor based at least on the cross coupled stiffness and the trended non-synchronous vibration over the period of time.
11. The system of any preceding clause, wherein the measurement vector comprises at least a two orthogonal direction vibration signal corresponding to the rotor assembly.
12. A turbo machine, the turbo machine comprising a rotor assembly comprising a magnetic material, a magnetic actuator positioned in magnetic communication with the magnetic material of the rotor assembly, wherein the magnetic actuator is configured to selectively output an electromagnetic force at the rotor assembly, and further wherein the magnetic actuator is configured to obtain a measurement vector corresponding to the rotor assembly, and a controller configured to store and execute instructions. The instructions comprise outputting, via the magnetic actuator, a baseline electromagnetic force to the rotor assembly; obtaining, via the magnetic actuator, the measurement vector at the rotor assembly; determining non-synchronous vibrations corresponding to the rotor assembly based at least on the measurement vector and a rotor speed of the rotor assembly; determining cross coupled stiffness corresponding to the rotor assembly based at least on the measurement vector, the rotor speed, and a predetermined rotor dynamics model of the rotor assembly; determining an adjusted electromagnetic force of the rotor assembly based at least on the cross coupled stiffness and a damping factor corresponding to the electromagnetic force output from the magnetic actuator; and generating an output signal corresponding to the adjusted electromagnetic force to the rotor assembly.
13. The turbo machine of any preceding clause, wherein determining non-synchronous vibrations comprises removing a synchronous vibrations signal via a Fourier transform function.
14. The turbo machine of any preceding clause, wherein determining cross coupled stiffness is further based at least on the predetermined rotor dynamics model comprising a predetermined frequency of a rotor bending mode.
15. The turbo machine of any preceding clause, the instructions further comprising filtering the output signal corresponding to the adjusted electromagnetic force based at least on a determined frequency of a rotor bending mode of the determined non-synchronous vibrations.
16. The turbo machine of any preceding clause, the instructions further comprising converting the output signal from a current corresponding to a digital signal to a voltage corresponding to an analog signal, wherein the analog signal corresponds to the adjusted electromagnetic force; and generating to the magnetic material at the rotor assembly, via the magnetic actuator, the adjusted electromagnetic force corresponding to the output signal.
17. The turbo machine of any preceding clause, the instructions further comprising trending, over a period of time, the non-synchronous vibrations and the cross coupled stiffness based on a threshold; and determining the damping factor based at least on the cross coupled stiffness and the trended non-synchronous vibration over the period of time.
18. The turbo machine of any preceding clause, wherein determining the adjusted electromagnetic force is further based on a proportional compensation factor corresponding to a gap between the magnetic actuator and the magnetic material of the rotor assembly.
19. The turbo machine of any preceding clause, wherein the proportional compensation factor comprises an integral of the output signal corresponding a current corresponding to the adjusted electromagnetic force to the rotor assembly, and wherein a slope of the current corresponds to the gap between the magnetic actuator and the rotor assembly.
20. The turbo machine of any preceding clause, comprising the system of any preceding clause.
21. A method for controlling a rotor assembly of a turbo machine, the method comprising outputting a baseline electromagnetic force to the rotor assembly via a magnetic actuator; obtaining a measurement vector corresponding to a vibration signal from the rotor assembly; obtaining a rotor speed signal of the rotor assembly, wherein the rotor speed signal corresponds to a frequency speed of the rotor assembly; determining non-synchronous vibrations corresponding to the rotor assembly based at least on the measurement vector and the rotor speed signal of the rotor assembly; determining cross coupled stiffness corresponding to the rotor assembly based at least on the measurement vector, the rotor speed signal, and a predetermined rotor dynamics model of the rotor assembly, wherein the predetermined rotor dynamics model comprises a predetermined frequency of a rotor bending mode; determining an adjusted electromagnetic force of the rotor assembly based at least on the cross coupled stiffness and a damping factor corresponding to the electromagnetic force output from the magnetic actuator; and generating an output signal corresponding to the adjusted electromagnetic force to the rotor assembly.
22. The method of any preceding clause, wherein determining non-synchronous vibrations comprises removing a synchronous vibrations signal via a Fourier transform function.
23. The method of any preceding clause, wherein determining cross coupled stiffness is further based at least on the predetermined rotor dynamics model comprising a predetermined rotor bending mode of the rotor assembly.
24. The method of any preceding clause, wherein determining the adjusted electromagnetic force is further based on a proportional compensation factor.
25. The method of any preceding clause, further comprising filtering the output signal corresponding to the adjusted electromagnetic force based at least on a determined frequency of a rotor bending mode of the determined non-synchronous vibrations.
26. The method of any preceding clause, further comprising converting the output signal from a digital signal to an analog signal via a current to power amplifier.
27. The method of any preceding clause, further comprising generating to the rotor assembly, via the magnetic actuator, the adjusted electromagnetic force corresponding to the output signal.
28. The method of any preceding clause, wherein converting the output signal comprises converting the output signal from a current unit to a voltage unit corresponding to the adjusted electromagnetic force.

29. The method of any preceding clause, further comprising trending, over a period of time, the non-synchronous vibrations and the cross coupled stiffness based on a threshold.
30. The method of any preceding clause, further comprising determining the damping factor based at least on the cross coupled stiffness and the trended non-synchronous vibration over the period of time.
31. The method of any preceding clause, wherein the measurement vector comprises at least a two orthogonal direction vibration signal corresponding to the rotor assembly.
32. The method of any preceding clause, wherein one or more steps of the method is stored in the system of any preceding clause, and wherein the controller of any preceding clause is configured to execute one or more steps of the method.
33. The method of any preceding clause, for controlling the turbo machine of any preceding clause.

What is claimed is:

1. A system for controlling rotor dynamics of a rotor assembly, the system comprising:
   a magnetic actuator positioned in magnetic communication with the rotor assembly, wherein the magnetic actuator is configured to selectively output an electromagnetic force at the rotor assembly, and wherein the magnetic actuator is configured to obtain a vibration signal at the rotor assembly; and
   a controller configured to store and execute instructions, the instructions configured for:
      outputting a first output signal to apply, via the magnetic actuator, a first electromagnetic force to cause a vibratory response of the rotor assembly;
      obtaining a first vibrations signal representing the vibratory response of the rotor assembly;
      determining a first non-synchronous vibration signal corresponding to the rotor assembly based at least on the first vibrations signal and a rotor speed of the rotor assembly;
      determining a first cross coupled stiffness corresponding to the rotor assembly based at least on the first non-synchronous vibration signal and the first electromagnetic force;
      determining a second electromagnetic force to be applied by the magnetic actuator to the rotor assembly based at least on the first cross coupled stiffness and a proportional compensation factor corresponding to a gap between the magnetic actuator and a magnetic material of the rotor assembly; and
   generating a second output signal corresponding to the determined second electromagnetic force.
2. The system of claim 1, wherein determining the first non-synchronous vibration signal comprises removing frequencies associated with the rotor speed from the first vibrations signal.
3. The system of claim 1, wherein determining the first cross coupled stiffness is based at least on a parameter that is also part of a rotor dynamics model of the rotor assembly.
4. The system of claim 1, the instructions further configured for:
   filtering the second output signal corresponding to the determined second electromagnetic force based at least on a determined frequency of a rotor bending mode of the first non-synchronous vibration signal.
5. The system of claim 4, the instructions further configured for:
   converting the second output signal from a digital signal to an analog signal via an amplifier.
6. The system of claim 5, further comprising:
   applying to the rotor assembly, via the magnetic actuator, the second electromagnetic force corresponding to the second output signal.
7. The system of claim 5, wherein converting the second output signal comprises converting the second output signal from a current unit to a voltage unit corresponding to the second adjusted electromagnetic force.
8. The system of claim 1, the instructions further configured for:
   iteratively determining, over a period of time, the first non-synchronous vibration signal and the first cross coupled stiffness; and
   iteratively determining the second electromagnetic force to reduce the first non-synchronous vibration signal with respect to a threshold.
9. The system of claim 1, wherein the first vibrations signal comprises at least a two orthogonal direction vibration signal corresponding to the rotor assembly.
10. A turbo machine, the turbo machine comprising:
    a rotor assembly comprising a magnetic material;
    a magnetic actuator positioned in magnetic communication with the magnetic material of the rotor assembly, wherein the magnetic actuator is configured to selectively output an electromagnetic force at the rotor assembly, and further wherein the magnetic actuator is configured to obtain a vibration signal at the rotor assembly; and
    a controller configured to store and execute instructions, the instructions configured for:
       outputting a first output signal to apply, via the magnetic actuator, a first electromagnetic force to cause a vibratory response of the rotor assembly;
       obtaining, via the magnetic actuator, a first vibrations signal representing the vibratory response of the rotor assembly;
       determining a first non-synchronous vibrations signal corresponding to the rotor assembly based at least on the first vibrations signal and a rotor speed of the rotor assembly;
       determining a first cross coupled stiffness corresponding to the rotor assembly based at least on the first non-synchronous vibrations signal and the first electromagnetic force;
       determining a second electromagnetic force to be applied by the magnetic actuator to the rotor assembly based at least on the first cross coupled stiffness and a proportional compensation factor corresponding to a gap between the magnetic actuator and a magnetic material of the rotor assembly; and
    generating a second output signal corresponding to the determined second electromagnetic force.
11. The turbo machine of claim 10, wherein determining the first non-synchronous vibrations signal comprises removing frequencies associated with the rotor speed from the first vibrations signal.
12. The turbo machine of claim 10, wherein determining the first cross coupled stiffness is based at least on a parameter that is also part of a rotor dynamics model of the rotor assembly.
13. The turbo machine of claim 10, the instructions further configured for:
    filtering the second output signal corresponding to the determined second electromagnetic force based at least on a determined frequency of a rotor bending mode of the first non-synchronous vibrations signal.

14. The turbo machine of claim 13, the instructions further configured for:
converting the second output signal from a current corresponding to a digital signal to a voltage corresponding to an analog signal; and
applying to the magnetic material at the rotor assembly, via the magnetic actuator, the second electromagnetic force corresponding to the second output signal.

15. The turbo machine of claim 10, the instructions further configured for:
iteratively determining, over a period of time, the first non-synchronous vibrations signal and the first cross coupled stiffness; and
iteratively determining the second electromagnetic force to reduce the first non-synchronous vibrations signal with respect to a threshold.

16. The turbo machine of claim 10, wherein the proportional compensation factor comprises an integral of the second output signal corresponding to a current, wherein a slope, of the current and the determined second electromagnetic force, is proportional to the gap.

17. A method for controlling a rotor assembly of a turbo machine, the method comprising:
outputting a first electromagnetic force to cause a vibratory response of the rotor assembly via a magnetic actuator;
obtaining a first vibration signal representing the vibratory response of the rotor assembly;
obtaining a rotor speed signal of the rotor assembly, wherein the rotor speed signal corresponds to a frequency speed of the rotor assembly;
determining a first non-synchronous vibration signal corresponding to the rotor assembly based at least on the first vibration signal and the rotor speed signal of the rotor assembly;
determining a first cross coupled stiffness corresponding to the rotor assembly based at least on the first non-synchronous vibration signal and the first electromagnetic force;
determining a second electromagnetic force to be applied by the magnetic actuator to the rotor assembly based at least on the first cross coupled stiffness and a proportional compensation factor corresponding to a gap between the magnetic actuator and a magnetic material of the rotor assembly; and
generating a second output signal corresponding to the determined second electromagnetic force and applying the second electromagnetic force to the rotor assembly.

* * * * *